US008985819B2

(12) United States Patent
Hessling

(10) Patent No.: US 8,985,819 B2
(45) Date of Patent: Mar. 24, 2015

(54) AIRCRAFT LIGHT FOR EMITTING LIGHT IN A DESIRED SPATIAL ANGULAR REGION AND WITH A DESIRED LIGHT DISTRIBUTION

(71) Applicant: Goodrich Lighting Systems GmbH, Lippstadt (DE)

(72) Inventor: Andre Hessling, Koblenz (DE)

(73) Assignee: Goodrich Lighting Systems GmbH (DE)

( * ) Notice: Subject to any disclaimer, the term of this patent is extended or adjusted under 35 U.S.C. 154(b) by 282 days.

(21) Appl. No.: 13/626,085

(22) Filed: Sep. 25, 2012

(65) Prior Publication Data

US 2013/0077330 A1 Mar. 28, 2013

(30) Foreign Application Priority Data

Sep. 26, 2011 (EP) .................................... 11182736

(51) Int. Cl.
*B64D 47/06* (2006.01)
*F21V 29/00* (2006.01)

(52) U.S. Cl.
CPC ................ *B64D 47/06* (2013.01); *F21V 29/00* (2013.01); *B64D 2203/00* (2013.01)
USPC ............................ 362/470; 362/548; 362/247

(58) Field of Classification Search
CPC .......... B64D 47/06; F21V 7/09; F21V 29/004
USPC .......................... 362/470.516, 517, 518, 247
See application file for complete search history.

(56) References Cited

U.S. PATENT DOCUMENTS

| | | | | |
|---|---|---|---|---|
| 6,848,819 | B1 | 2/2005 | Arndt | |
| 2002/0048176 | A1* | 4/2002 | Ruda et al. | 362/551 |
| 2003/0156416 | A1 | 8/2003 | Stopa | |
| 2006/0007013 | A1 | 1/2006 | Singer | |
| 2010/0290222 | A1 | 11/2010 | Pickard et al. | |

FOREIGN PATENT DOCUMENTS

| | | | |
|---|---|---|---|
| DE | 10062153 | A1 | 6/2002 |
| WO | 2005108853 | A1 | 11/2005 |
| WO | 2005121637 | A1 | 12/2005 |

* cited by examiner

*Primary Examiner* — David V Bruce
(74) *Attorney, Agent, or Firm* — Cantor Colburn LLP

(57) ABSTRACT

An aircraft light for emitting light in a desired spatial angular region and with a desired light distribution, comprises a reflector having an upper reflector portion and a lower reflector portion both being symmetrical to a plane. A first row of LEDs are face away from the reflector. A second row of LEDs face towards the reflector. Each of the upper and lower portions of the reflector comprises first, second, and third reflective surfaces with the first reflective surface being convexly shaped, the second reflective surface being substantially flat, and the third reflective surface being partially parabolically shaped.

10 Claims, 3 Drawing Sheets

AIRCRAFT LIGHT FOR EMITTING LIGHT IN A DESIRED SPATIAL ANGULAR REGION AND WITH A DESIRED LIGHT DISTRIBUTION

BACKGROUND OF THE INVENTION

The present invention relates to an aircraft light for emitting light in a desired spatial angular region and with a desired light distribution. Accordingly, the aircraft light can be used in particular as a strobe light and as a combined strobe and position light, in particular as a combined strobe and position tail light.

DESCRIPTION OF THE PRIOR ART

External aircraft lights have to emit light in a desired spatial angular region and with a desired light distribution (both horizontally as well as vertically). This is true e.g. for a strobe tail light of an aircraft. In order to be able to fulfill the requirements when using LEDs instead of xenon light sources, it is necessary to arrange a plurality of LEDs facing into different directions in order to emit the light in the desired spatial angular region and with the desired light distributions. Most often strobe lights and aircraft position lights are separated from each other which means additional mechanical and electrical expenditures which results in increased costs.

In the prior art, diverse designs of LED beacon lights are known. In these known designs, a plurality of LEDs is used emitting their light directly into the desired spatial angular region. Most of the known designs use optics for each LED and cannot easily be combined with a position light functionality.

Moreover, from WO-A-2005/121637, WO-A-2005/108853, and DE-A-100 62 153 lights are known which use light sources emitting their light directly into the desired spatial angular region while other light sources emit their light indirectly, i.e. towards reflector surfaces for reflecting the light into the desired spatial angular region.

Vehicle lights are known from DE 100 62 153 A1; US 2010/290,222 A1; US 2006/007,013 A1; DE 199 22 176 A1 and US 2003/156,416.

SUMMARY OF THE INVENTION

It is an object of the present invention to provide an aircraft light using LEDs for emitting light in a desired spatial angular region and with a desired light distribution.

According to the invention, this object is achieved by means of an aircraft light for emitting light in a desired spatial angular region and with a desired light distribution, comprising

- a reflector having an upper reflector portion and a lower reflector portion both reflector portions being symmetrical to a plane with the upper and lower reflector portions being arranged on opposite sides of the plane,
- first LEDs facing away from the reflector for emitting light directly into the desired spatial angular region, wherein the first LEDs are linearly arranged side-by-side within the plane, and
- second LEDs facing towards the reflector for emitting light to be reflected by the reflector into the desired spatial angular region, wherein the second LEDs are linearly arranged side-by-side within the plane facing away from the first LEDs,
- wherein each of the first and second LEDs emits light into a spatial angular region symmetrical to the plane with the spatial angular region divided into a first subregion closest to the plane, a second subregion farthest away from the plane, and a third subregion arranged between the first and second subregion, and
- wherein each of the upper and lower portions comprises first, second, and third reflective surfaces associated to the first, second, and third angular subregions of the light emitted by the first and second LEDs, with the first reflective surface being convexly shaped, the second reflective surface being substantially flat, and the third reflective surface being partially parabolically shaped.

According to the invention, a first group of LEDs (referred to as first LEDs) emit their light directly into the desired spatial angular region, while a second group of LEDs (referred to as second LEDs) emit their light away from the desired spatial angular region towards a reflector by which the light of the second LEDs is reflected towards the desired spatial angular region. The reflector is provided with at least three reflector portions shaped so as to reflect the light of the second LEDs such that, together with the light distribution obtained by the first LEDs, the desired overall light distribution in the desired spatial angular region can be achieved. The diverse reflective surfaces of the reflector are associated to light emitted by the second LEDs into different subregions into which each of the second LEDs emit its light.

The reflector of the aircraft light according to the invention basically can be divided into an upper reflector portion and a lower reflector portion both being symmetrical to a plane with the upper and lower reflector portions arranged at opposite sides of the plane. The first LEDs are arranged so as to face away from the reflector for directly emitting light into the desired spatial angular region. The first LEDs are arranged linearly, i.e. along a straight line and side by side. The line is arranged within the plane. The second LEDs are facing towards the reflector for emitting light to be reflected by the reflector into the desired spatial angular region. Also the second LEDs are arranged linearly side by side within the plane and face away from the first LEDs. In one embodiment of the present invention, the first and second LEDs are arranged at opposite sides of a carrier or other immediate element arranged between the first and second LEDs and carrying the same. In a further embodiment, the carrier element can be a cooling element for passively or actively cooling the first and second LEDs.

The aircraft light according to the invention can further be provided with a cover which can be curved aerodynamically and does not require any optical elements.

The main purpose of the aircraft light according to the invention is its application as a strobe light. Accordingly, the LEDs of the aircraft light are operable in a flashlight mode by means of a control unit. However, the aircraft light of the present invention can also be provided with position light LEDs which are permanently activated. According to the invention, both types of aircraft light can be combined in a single housing. The LEDs used as position light can be provided with special reflector elements in order to fulfill the light distribution requirements of position lights in aircrafts.

The present invention allows for a very compact, efficient, wide spread and thermally robust strobe light at reduced cost. It is especially well suited for the tail strobe light of an aircraft and with a curved aerodynamic lens (also referred to as cover) and does not require any optical elements in the lens. According to the invention, it is also possible to implement the permanent illuminated tail position light functionality into the aircraft light without any major further optical design work. A few of the LEDs (e.g. about 10%) of the aircraft light would then be kept on permanently, while the other LEDs are flashing to fulfill the strobe light functionality.

The aircraft light according to the invention is based on the concept of having a large optical system to create the peaks within the required light distribution with the aid of the first LEDs facing in the opposite direction of the main illumination action (desired spatial angular region) wherein the reflector is used to direct the light emitted by the second LEDs towards the main illumination action direction, namely towards the desired spatial angular region. The majority of the LEDs of the aircraft according to the invention, namely the first LEDs, are facing towards the desired spatial angular region and emit their light without any significant losses due to an optical system or the like.

Additionally, the curved cover or lens which can be used in the aircraft light according to the invention allows for the light to pass through the cover perpendicularly for the most part of the light rays, allowing for minimal transmission losses. The cover or lens suitable for the present invention can be designed so that no light rays of the LEDs are passing through the cover at more than 50 degrees in the vertical axis. Merely two carrier elements are necessary, with the one carrier element carrying the first LEDs and the other carrier element carrying the second LEDs. Some of the LEDs (some of the first and/or some of the second LEDs) can be operated permanently for providing the navigation light functionality while the others (namely the majority) of the first and second LEDs are flashing performing the strobe light functionality.

The structure of the aircraft light according to the invention can be described as an individually controllable double-string of LEDs emitting their light in opposite directions. A relatively large optical system is used in the aircraft light according to the invention which comprises the reflector in rearward direction for creating a peak of the desired light distribution within the desired spatial angular region. The highly efficient wide-spread illumination required according to the desired light distribution is created by the LEDs directly facing into the desired spatial angular region in conjunction with the curved lens, minimizing transmission losses as explained above. The light rays of the LEDs for the most part are passing perpendicular through the lens or light cover. Individually controllable LEDs allow for an integration of a strobe and a position light function in the same housing.

BRIEF DESCRIPTION OF THE DRAWINGS

A full and enabling disclosure of the present invention, including the best mode thereof, enabling one of the ordinary skill in the art to carry out the invention, is set forth in greater detail in the following description, including reference to the accompanying drawing in which.

DESCRIPTION OF A PREFERRED EMBODIMENT

Figure 1:
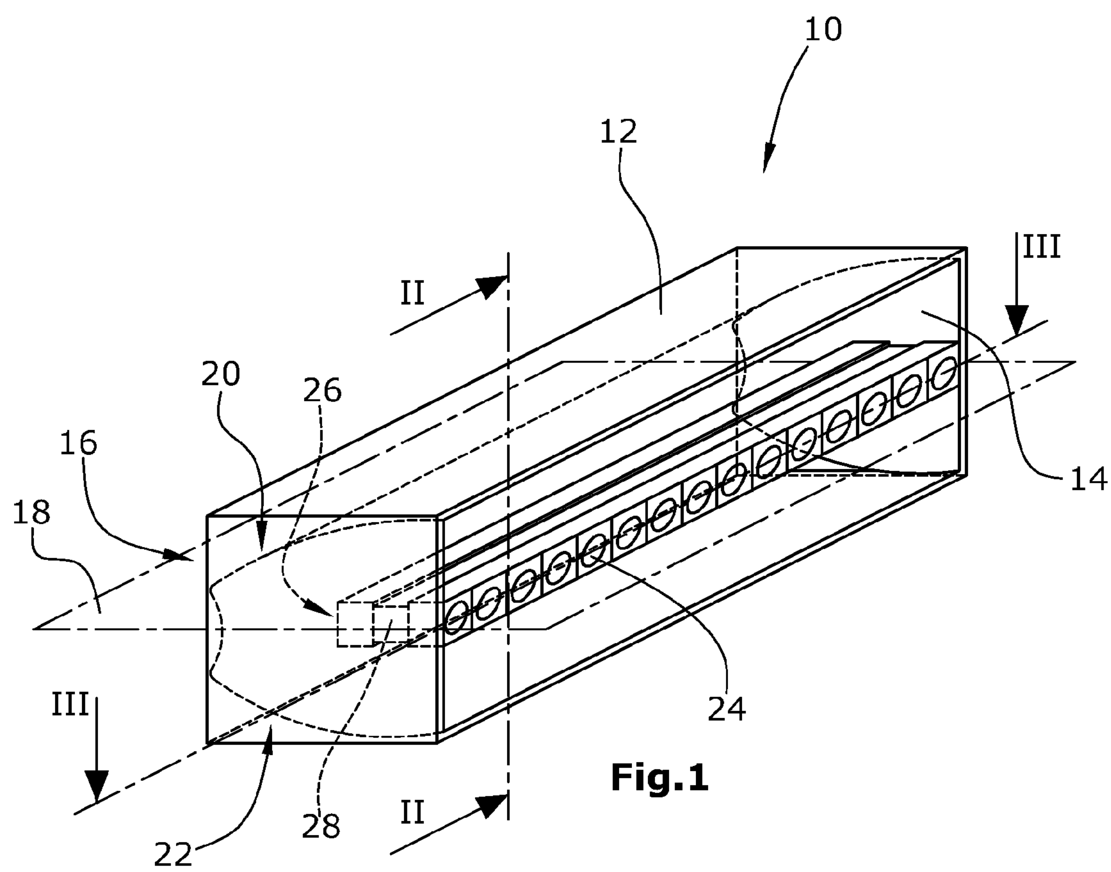
FIG. 1 is a perspective view of a combined aircraft strobe and position light.

According to FIG. 1, an aircraft light 10 according to the invention comprises a longitudinal housing 12 having a front opening 14 and a reflector 16 arranged within the housing 12. The reflector 16 is symmetrical with respect to a plane 18 and comprises an upper reflector portion 20 and a lower reflector portion 22. In FIG. 1 the lens or cover by which the front opening 14 of the housing 12 is closed, is not shown.

Within the housing 12 there is arranged a strip-like arrangement of LEDs facing in opposite directions. First LEDs 24 are arranged so as to emit light directly into a desired spatial angular region in front of the front opening 14. In other words, the first LEDs 24 are facing away from the reflector 16. The first LEDs 24 are arranged side by side along a single line, i.e. are arranged linearly within the plane 18. Second LEDs 26 are arranged so as to face away from the first LEDs and, accordingly, towards the reflector 16 so that their light is reflected by the reflector 16 towards the desired spatial angular region. In this embodiment, the number of second LEDs 26 is less than the number of the first LEDs 24. The ratio between the numbers of the first and second LEDs can be 1.5 to 3. Other ratios are also possible.

As in case of the first LEDs 24, also the second LEDs 26 are arranged linearly side by side along a single line located within the plane 18. Between both groups of first and second LEDs 24,26 there is arranged a heat sink element 28 (see e.g. FIGS. 2 and 3) which is made of thermally conductive material and which can be for passive and/or active cooling, i.e. can be provided as a heat pipe. According to the invention, also other carrier and cooling concepts for the first and second LEDs 24,26 can also be used.

Figure 2:
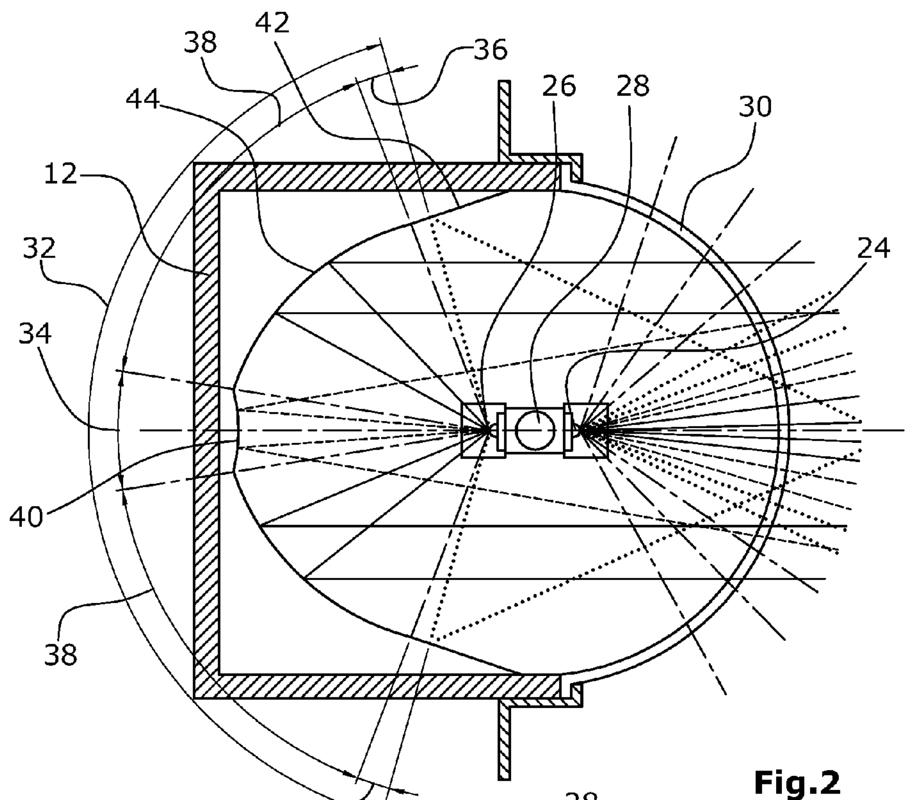
FIG. 2 is a vertical sectional view of the aircraft light according to FIG. 1.
Figure 3:
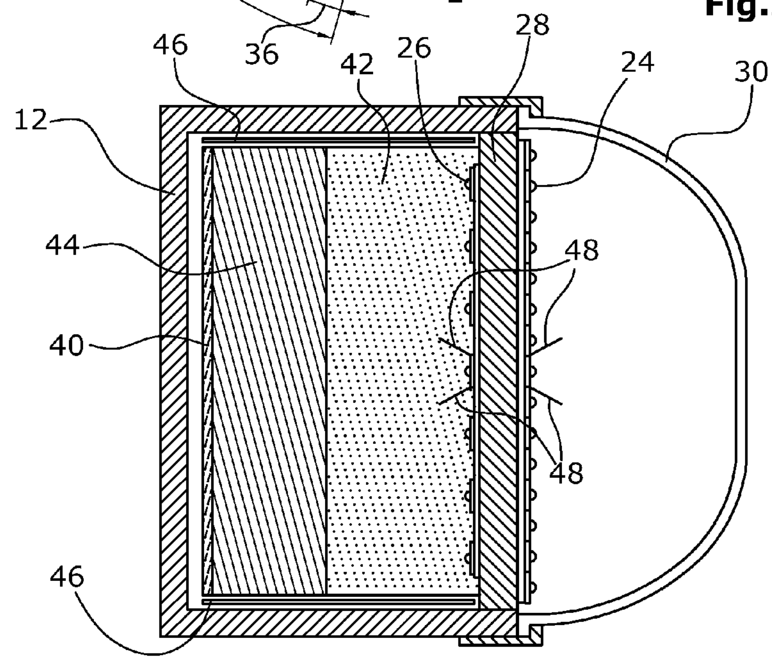
FIG. 3 is a horizontal sectional view of the aircraft light according to FIG. 1.

As can be seen in FIGS. 2 and 3, a transparent cover 30 or lens is used for closing the front opening 14 of the housing 12. Most of the light rays emitted by the first and second LEDs 24,26 pass through the cover 30 in an angle of less than 50 degree (with respect to the direction normal to the surface of the cover at the site where the light ray passes the cover). This reduces and minimizes transmission losses.

The optical features of the aircraft light 10 resulting in the desired light distribution in the desired spatial angular region will be explained hereinbelow referring to FIGS. 2 to 5. As can be seen in FIG. 2, each of the first and second LEDs 24,26 emit light into a spatial angular region marked by reference numeral 32 in FIG. 2 for one of the second LEDs 26. This individual spatial angular region 32 is divided into a first subregion 34 symmetrical to the plane 18 and closest thereto. A second subregion 36 of the individual LED spatial angular region is farthest away from the plane 18. Finally, a third subregion 38 of the spatial angular region of an LED is located between the first and the second subregion 34 and 36, respectively.

Each of the upper and lower reflector portions 20 and 22 is provided with first, second, and third reflective surfaces associated to first, second, and third angular subregion of the light emitted by the first and the second LEDs 24,26. The first reflective surfaces 40 of both reflector portions 20 and 22 are located closest to the plane 18 and at opposite sides thereof. These two first reflective surfaces 40 have an convexly shaped overall design and are responsible for reflecting the light rays emitted into the first spatial angular subregion of the LEDs resulting in an increased light intensity in the range between about +20 and −20 degree in the vertical light distribution (see FIG. 4). Each of the upper and lower reflector portions 20,22 is provided with a second reflective surface 42 responsible for reflecting light rays emitted into the second subregion 36. These second reflective surfaces 42 are substantially plane and light reflected into these regions add further light intensity within the range of +30 and −30 degrees of the desired vertical light distribution according to FIG. 4.

Figure 4:
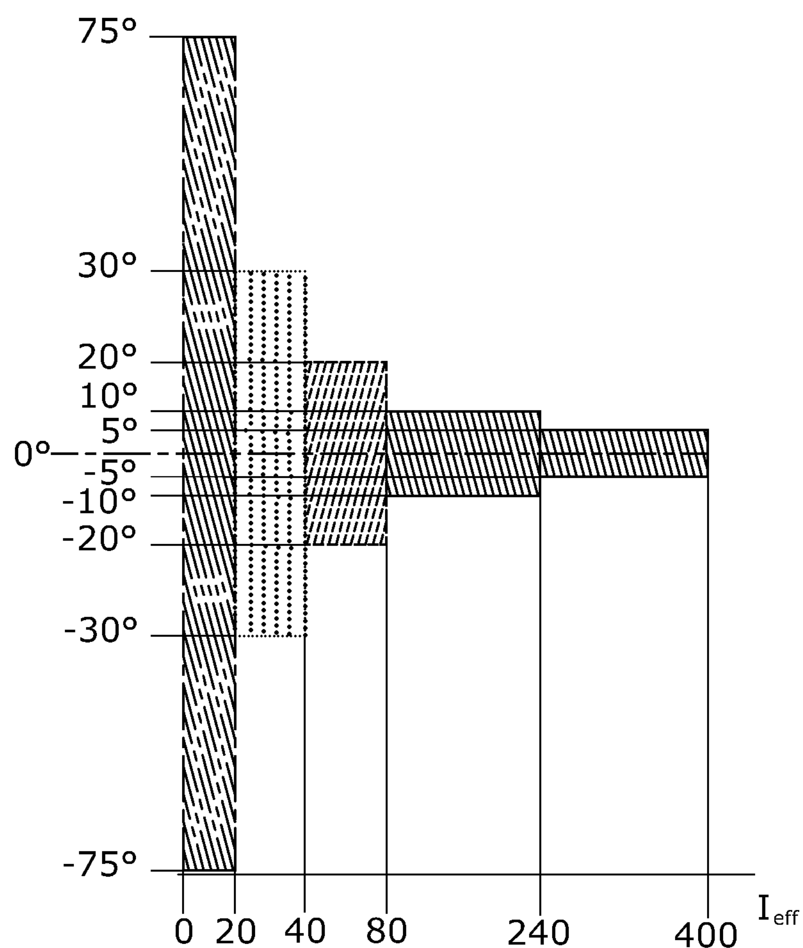
FIG. 4 is a representation of the achieved vertical light distribution.
Figure 5:
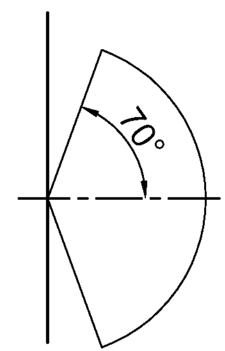
FIG. 5 is a illustration of the horizontal angle within which the position light functionality of the aircraft light according to FIG. 1 can be obtained.

Finally, between the first and second reflective surfaces 40 and 42 of the upper and lower reflector portions 20 and 22, there is arranged a third reflective surface 44 which is responsible for reflecting light emitted into the third subregion 38 resulting in increased light intensity within the range of +10 and −10 degrees of the vertical light distribution desired according to FIG. 4. The second reflective surface 44 is shaped like a part of a parabolic surface as can be seen in FIG. 2.

Accordingly, due to the special design of the reflector 16, the light emitted by the second LEDs 26 facing away from the desired spatial angular region to be illuminated by the aircraft light, can be used to fulfill the required light distribution according to FIG. 4. This desired light distribution also results from the light emitted by the first LEDs 24 facing away from the reflector 16 and, accordingly, emitting their light directly into the desired spatial angular region. In FIG. 4 the individual regions of the vertical light distribution are marked by hatching using differently designed lines which lines are also used in FIG. 2 for defining the light rays emitted by the first and second LEDs and responsible for the individual regions of the light distribution according to FIG. 4. The same is true for the representation of the individual first, second, and third reflective surfaces 40,42,44 of the reflector 16.

In FIG. 3 further specific features of this embodiment of the invention are shown. According to FIG. 3, within the housing 12 there are arranged mirrors 46 at the lateral end faces of the housing 12. These mirrors reflect light of those of the second LEDs 26 which are located rather close to these mirrors 46. Moreover, according to FIG. 3, the first and second LEDs located in the center are provided with additional reflectors 48. These LEDs in the center of the two LED lines can be permanently on and function as a position light with the reflectors 48 limiting the angular range to +70 and −70 degrees (see FIG. 5) as required for e.g. a position tail light of an aircraft.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow.

The invention claimed is:

1. Aircraft light for emitting light in a desired spatial angular region and with a desired light distribution, comprising a reflector (16) having an upper reflector portion (20) and a lower reflector portion (22), both reflector portions (20, 22) being symmetrical to a plane (18), with the upper and lower reflector portions (20,22) being arranged on opposite sides of the plane (18), first LEDs (24) facing away from the reflector (16) for emitting light directly into the desired spatial angular region, wherein the first LEDs (24) are linearly arranged side-by-side within the plane (18), and second LEDs (26) facing towards the reflector (16) for emitting light to be reflected by the reflector (16) into the desired spatial angular region, wherein the second LEDs (26) are linearly arranged side-by-side within the plane (18) facing away from the first LEDs (24), wherein each of the first and second LEDs (24,26) emit light into a spatial angular region (32) symmetrical to the plane (18) with the spatial angular region (32) divided into a first subregion (34) closest to the plane (18), a second subregion farthest away from the plane (18), and a third subregion (38) arranged between the first and second subregions (34,36), and wherein each of the upper and lower portions (20,22) comprises first, second, and third reflective surfaces (40,42, 44) associated to the first, second, and third angular subregions (34,36,38) of the light emitted by the first and second LEDs (24,26), with the first reflective surface (40) being convexly shaped, the second reflective surface (42) being substantially flat, and the third reflective surface (44) being partially parabolically shaped.

2. Aircraft light according to claim 1, wherein the reflector (16) comprises lateral ends provided with substantially plane mirrors (46) for reflecting light laterally emitted by the first and second LEDs (24,26) adjacent to the lateral ends, respectively.

3. Aircraft light according to claim 1, wherein the number of first LEDs (24) is higher than the number of second LEDs (26).

4. Aircraft light according to claim 1, wherein the first and second LEDs (24,26) are distributed along substantially identical distances between lateral ends of the reflector (16), respectively.

5. Aircraft light according to claim 1, wherein at least one of the first LEDs (24) and/or at least one of the second LEDs (26) comprises lateral reflector elements associated to the respective first and/or second LEDs (24,26) for providing a lateral limitation of the light emitted by the at least one of the first and/or second LEDs (24,26) so as to provide a permanent position light.

6. Aircraft light according to claim 5, wherein the remaining first and second LEDs (24,26) are operable in a flashlight mode.

7. Aircraft light according to claim 1, wherein the first and second LEDs (24,26) are all operable in a flashlight mode.

8. Aircraft light according to claim 1, further comprising a heat sink element (28) to which the first and second LEDs (24,26) are thermally coupled.

9. Aircraft light according to claim 8, wherein the heat sink element (28) is passively cooled by dissipating thermal energy received from the first and second LEDs (24,26) to a region surrounding the heat sink.

10. Aircraft light according to claim 8, wherein the heat sink element (28) is actively cooled by means of a cooling fluid flowing through and/or around the heat sink element (28).

* * * * *